United States Patent Office 2,871,450
Patented Jan. 27, 1959

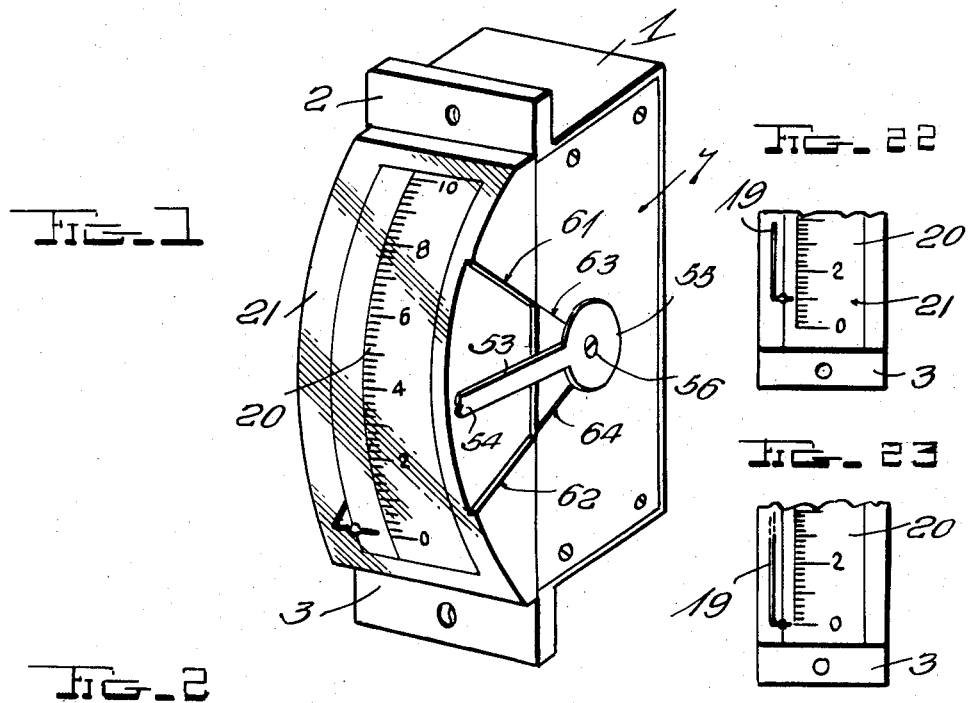
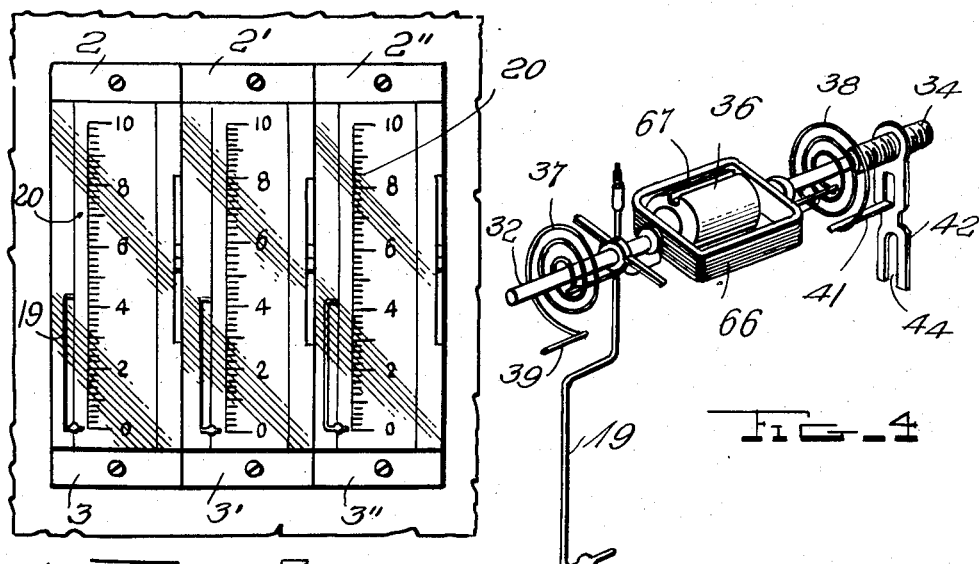
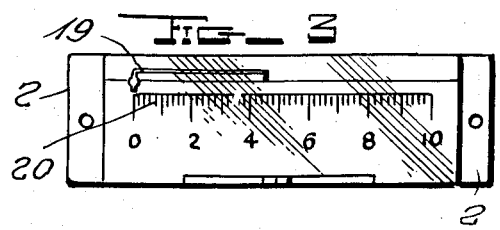

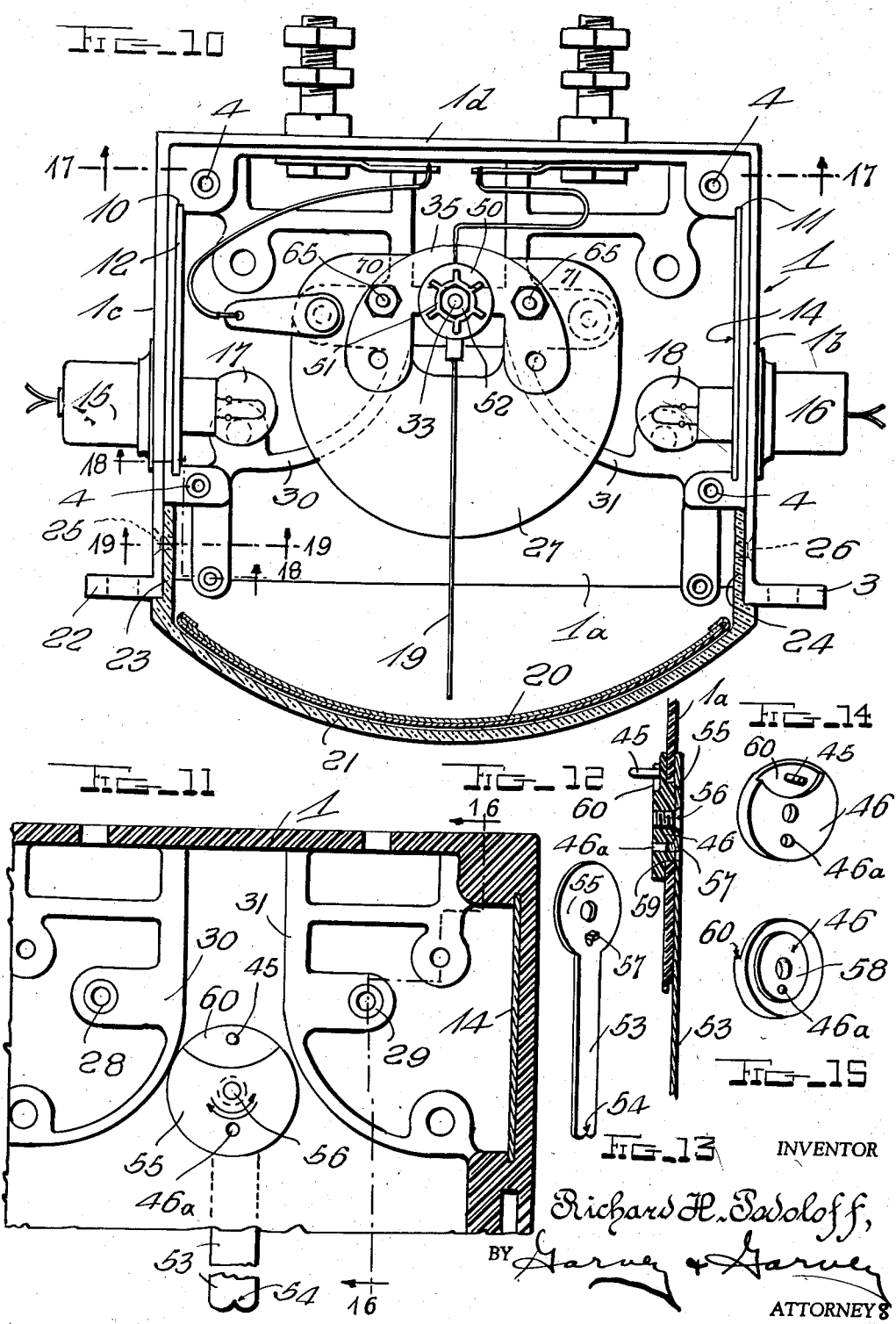

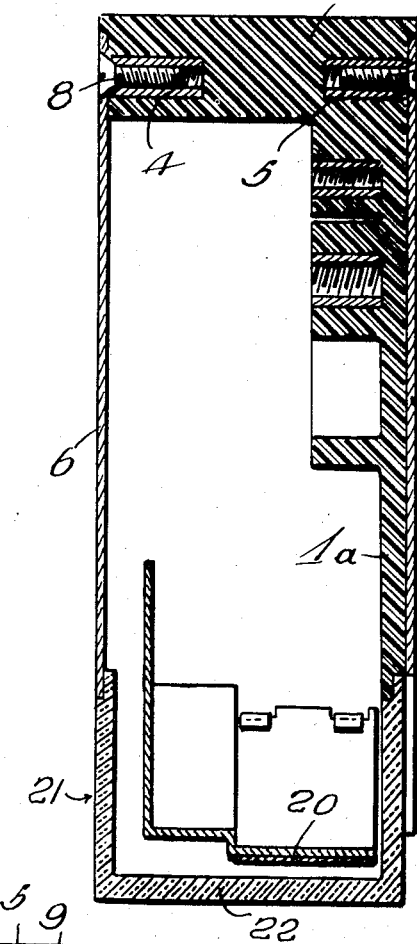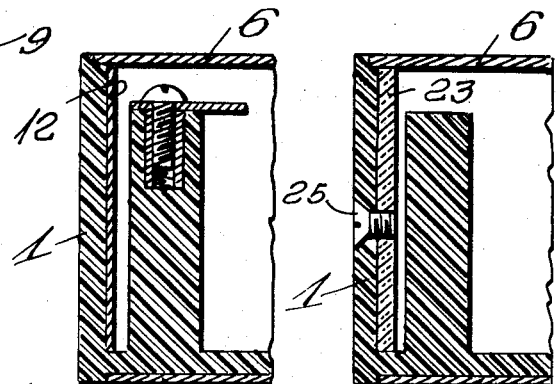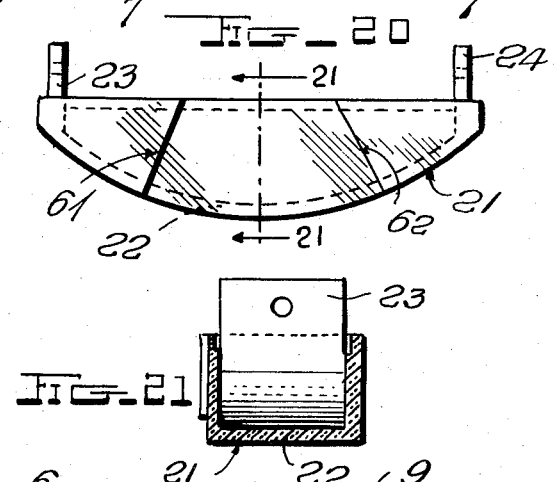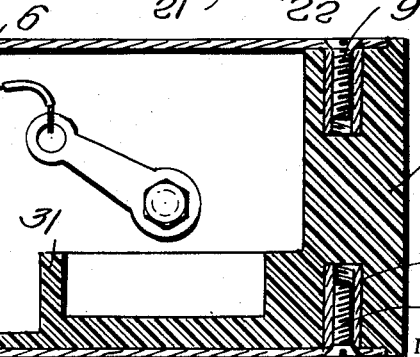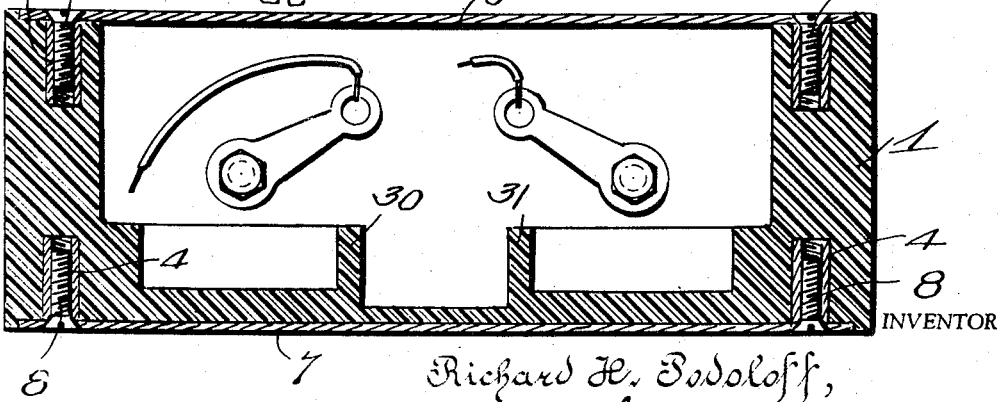

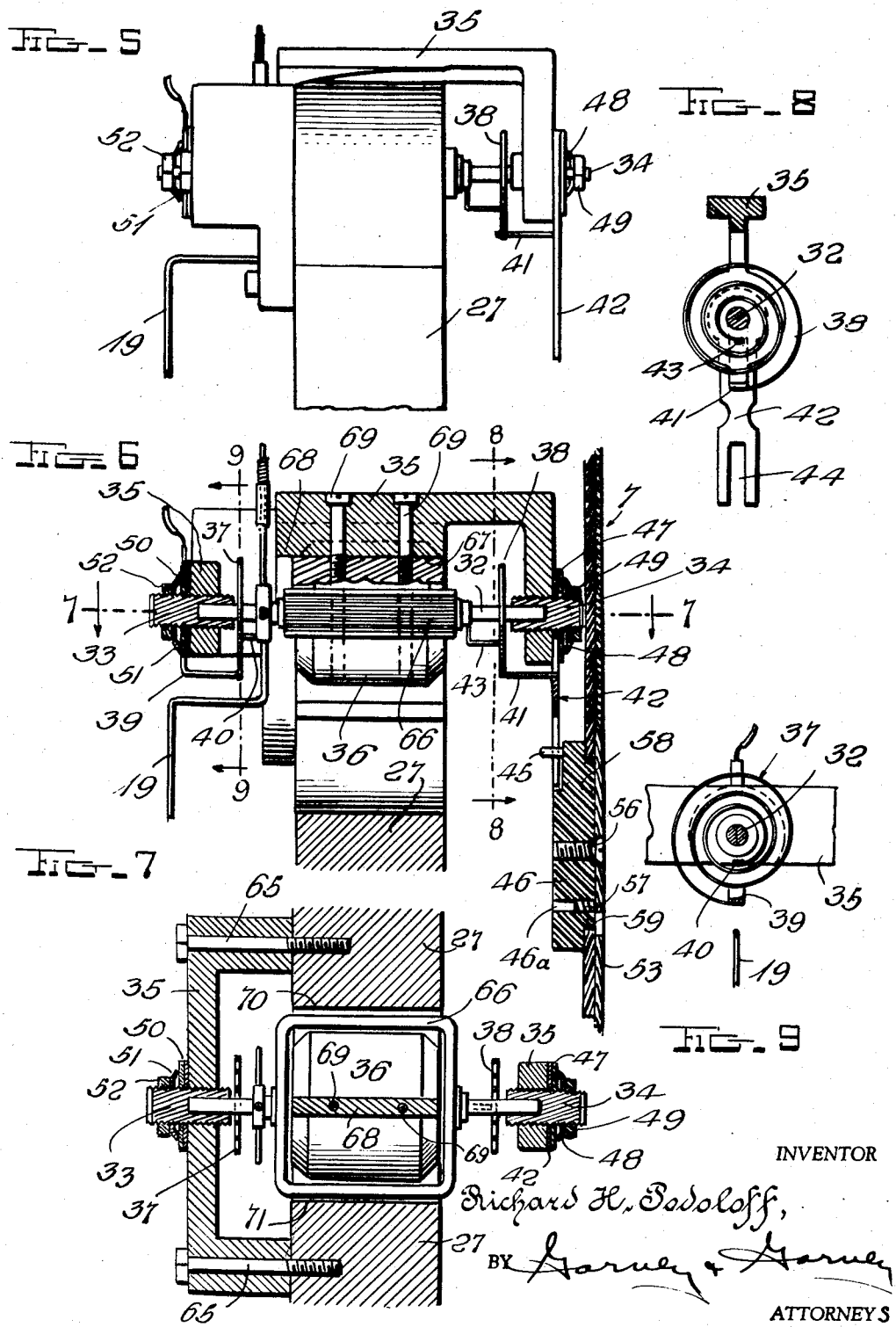

2,871,450

ELECTRICAL MEASURING INSTRUMENTS

Richard H. Podoloff, New Haven, Conn., assignor to International Instruments, Inc., a corporation of Connecticut Application October 9, 1956, Serial No. 614,986

15 Claims. (Cl. 324—154)

My invention relates broadly to electrical meters, and more particularly to a compact electrical meter assembly and a zero adjustment mechanism for the movable indicator of meters.

One of the objects of my invention is to provide a compact construction of electrical meter having means for magnetically shielding the meter operating mechanism while enabling a number of meters to be assembled in close proximity to each other with magnetic shield means for preventing inter-action of the magnetic systems of the several instruments upon each other.

Another object of my invention is to provide a construction of miniature electric meter assembly in which the case of the meter provides a convenient housing for electrical circuit components and scale illuminating means forming a packaged assembly for the meter within very small dimensions.

Still another object of my invention is to provide a construction of zero adjustment mechanism for the indicator of a meter assembly for insuring the proper adjustment of the indicator to zero position on the scale of the meter under varying conditions.

Still another object of my invention is to provide a construction of zero adjustment mechanism for electric meters in which an adjusting lever is operative from the front of the meter within certain limits in a plane substantially co-incident with the plane of the side of the meter case.

Still another object of my invention is to provide a construction for mounting the meter shaft of an electric meter with an indicator associated therewith and subjected to torsional control which is adjustable by an external lever member controllable from the front of the meter and movable in a plane which is substantially parallel with the plane of one side of the meter case and within limits formed by abutments constructed in the side of the meter case.

Other and further objects of my invention reside in the compact construction of meter mechanism assembly and the zero adjustment for the indicator thereof as set forth more fully in the specification hereinafter following by reference to the accompanying drawings in which:

Fig. 1 is a perspective view of the meter assembly of my invention and showing particularly the zero adjustment lever which operates between abutment limits formed in one side of the meter case;

Fig. 2 is a front elevational view showing a multiplicity of meter assemblies constructed in accordance with my invention and arranged for vertical panel mounting and illustrating particularly the zero adjustment lever for each meter operative from the front of the panel;

Fig. 3 is a front view of a meter constructed in accordance with my invention where the meter is arranged for horizontal mounting with respect to a panel, the view illustrating the zero adjustment lever operative from the front of the panel;

Fig. 4 is a perspective view showing the the meter operating mechanism and the indicator associated therewith and the torsional control means and the associated adjustment mechanism for the torsional control means;

Fig. 5 is a fragmentary side elevational view of the meter operating mechanism illustrating particularly the zero adjustment means for the indicator;

Fig. 6 is a vertical sectional view through the meter mechanism and the associated zero adjustment means;

Fig. 7 is a horizontal sectional view taken on line 7—7 of Fig. 6;

Fig. 8 is a vertical sectional view taken on line 8—8 of Fig. 6;

Fig. 9 is a vertical sectional view taken on line 9—9 of Fig. 6;

Fig. 10 is a view showing the interior assembly and arrangement for one form of meter embodying my invention;

Fig. 11 is an enlarged fragmentary portion of the meter housing of my invention showing the zero adjustment lever means journaled therein;

Fig. 12 is a perspective view of the zero adjustment lever;

Fig. 13 is an enlarged fragmentary section showing the manner of journaling the zero adjustment lever with respect to the meter housing;

Fig. 14 is a perspective view of one side of the journaling means for the zero adjustment lever;

Fig. 15 is a perspective view of the opposite side of the zero adjustment means shown in Fig. 14;

Fig. 16 is a longitudinal sectional view through the meter housing taken on line 16—16 of Fig. 11;

Fig. 17 is a transverse sectional view through the meter housing taken substantially on line 17—17 of Fig. 10;

Fig. 18 is a fragmentary sectional view taken substantially on line 18—18 of Fig. 10;

Fig. 19 is a fragmentary cross sectional view taken substantially on line 19—19 of Fig. 10;

Fig. 20 is a side view of the cover for the scale of the meter housing; and

Fig. 21 is a transverse sectional view through the cover for the meter scale; the view being taken substantially on line 21—21 of Fig. 20.

My invention is directed to the construction of an electrical meter which is substantially dust proof by reason of a novel construction of sealed casing which is compact in size and which includes an angularly shiftable member extending exteriorly of the case and movable to adjust the zero setting of the meter. The adjustable lever operates in a plane which is substantially coplanar with one side of the case, and thus occupies an extremely small amount of space. The operating shaft of the meter is torsionally balanced by torsion means extending clockwise adjacent one end of the shaft and counterclockwise adjacent the opposite end of the shaft. The indicator which is carried by the shaft is adjusted with respect to a calibrated scale by changing the torsion on one of the torsional balancing means. The adjustment means includes a radially extending bifurcated member pivoted at one end with respect to the meter frame and engageable at its opposite bifurcated end by means angularly adjustable through the externally mounted adjustment lever. Angular adjustment of the lever serves to angularly shift the bifurcated member. Intermediate the pivotal mounting of the bifurcated member and the bifurcated end thereof there is a connection to the torsional balancing means. By changing the condition of torsion the indicator carried by the meter operating shaft may be shifted with respect to the calibrated scale over which the indicator operates.

Referring to the drawings in more detail reference character 1 designates the molded frame of the meter having mounting lugs 2 and 3 thereon. The molded frame includes a multiplicity of screw threaded bushings embedded therein as shown at 4 and 5 enabling magnetic shield plates 6 and 7 to be fastened to opposite sides of the molded frame by means of fastening screws shown at 8 and 9. The side 1a of the molded frame 1 is molded integral with the opposite ends 1b and 1c and the back thereof shown at 1d. The interior of the case formed by the molded frame 1 is grooved at 10 and 11 to receive the slidably insertable magnetic shield plates shown at 12 and 14. The ends 1b and 1c serve as supports for the dust proof lamp socket housings 15 and 16 in which the incandescent lamps 17 and 18 are removably mounted interiorly of the case and serve to illuminate the interior of the case to render visible the readings of the movable indicator 19 with respect to the calibrated scale 20 behind the transparent closure 21. The closure 21 has a substantially curved wall 22 extending across the front thereof terminating in lugs 23 and 24 which fit within the ends 1b and 1c of the casing and are secured therein. The opposite sides of the closure 21 are reduced in section as indicated in Figs. 16 and 21 enabling the closure to fit within the side 1a and within the magnetic shield plate 6. The lugs 23 and 24 are secured within the ends 1b and 1c of the case by means of suitable screws 25 and 26.

The meter operating mechanism includes permanent magnet 27 which is mounted in screw threaded bushings 28 and 29 on interior projections 30 and 31 molded integral with the molded frame 1. The shaft of the meter is shown at 32 journaled at opposite ends in recessed screws 33 and 34 mounted in the auxiliary frame 35 which extends on opposite sides of the permanent magnet 27. The recessed screws 33 and 34 are adjustable to selected positions to accurately journal the instrument shaft 32 in the auxiliary frame 35. The shaft 32 is balanced for rotation by a torsional system consisting of spirally wrapped springs shown at 37 and 38. The spiral spring 37 is wrapped clockwise extending on its outside from a radially projecting arm 39 secured to the auxiliary frame 35 adjacent the mounting means for the recessed screw 33 and connected at its inner end with the arm 40 leading to the shaft 32 as shown more clearly in Fig. 9. The opposite torsional mounting consisting of spiral spring 38 is wrapped counterclockwise commencing at its outer end connected at its outside to lug 41 of the flat member 42 and connected at its inside to arm 43 which connects to shaft 32. Thus, shaft 32 is maintained in torsional balance under the clockwise tension of spring 37 and the counterclockwise tension of spring 38. These springs are initially adjusted so that the indicator 19 carried by shaft 32 normally rest in the zero position shown in the meters of Figs. 1, 2, 3, and 23. Variable conditions however inherently disturb the zero position of the indicator 19 as shown for example in Fig. 22. The mechanism of my invention is provided for accurately correcting the conditions shown in Fig. 22 to the condition illustrated in Fig. 23. This is accomplished by the provision of the flat member 42 which is bifurcated on its extremity shown at 44 to provide the tines of a fork which slidably embrace the pin 45 carried by the disc 46. The flat member 42 is secured beneath the washer member 47 fastened by the resilient member 48 secured in position by the lock nut 49 operating on the exterior screw threads of recessed screw 34. Because of the resiliency of the resilient member 48 the flat member 42 is free to rock or pivot about the recessed screw 34. By displacing the pin 45 through a curved path the tines of the fork 44 may be rocked or angularly shifted for changing the torsion on spring 37 to modify the condition of balance with respect to spring 38 and thus change the position of the indicator 19 with respect to the calibrated scale 20. The opposite end of the shaft journaled in recessed screw 33 is similarly mounted by means of the washer 50, resilient washer 51 and lock nut 52 engaging the external screw threads of recessed screw 33 in a manner similar to the assembly for the bearing of the opposite end of the shaft in recessed screw 34 except that in the case of the last mentioned bearing there is no necessity for the angular displacement of a member such as the flat member 42.

The displacement of pin 45 is effected by revolving the disc 46. This is accomplished by means of a lever 53 shown more clearly in Figs. 1 and 12. Lever 53 is flat and contains a V-shaped notch 54 in the extremity thereof which is engageable from the front of the meter for angularly shifting the lever within certain prescribed limits. The opposite end of the lever terminates in a disc 55 which is connected through screw 56 and the outstruck lug 57 with the disc 46. The disc 46 has a projection 58 thereon which is journaled in an opening 59 in the side 1a of the molded frame 1. The connection between discs 55 and 46 extends through the side 1a of the frame 1 and provides a tight seal for excluding moisture and preventing the entry of fungus and other detrimental growths. Disc 46 is provided with an opening 46a through which the lug 57 extends thereby keying the lever 53 to the disc 46 and insuring the angular movement of disc 46 simultaneously with the displacement of lever 53.

The disc 46 is provided on its interior face with an arcuate shaped recess 60. Pin 45 is symmetrically arranged centrally within the recess 60. The bifurcated end of the flat member 42 extends into the arcuate shaped recess 60 and is angularly movable therein as the pin 56 is displaced. Thus, by displacing the lever 53 between limits defined by the tapered recesses 61 and 62 in the closure 21 and the contiguous recesses 63 and 64 in the magnetic shield plate 7 the disc 55 is angularly moved and a corresponding movement imparted to the disc 46 for correspondingly displacing the flat member 42 through the tines 44 for changing the torsion on spring 38 and thereby varying the condition of balance on the torsional system for bringing the indicator 19 to zero position.

The auxiliary frame 35 is a casting that extends on opposite sides of the permanent magnet 27 and connects therewith through screws 65. The auxiliary frame 35 carries the magnetic core 36 which is located within the movable winding 66 that is carried by shaft 32 and around which the winding 66 moves. The magnetic core 36 is cylindrical and is tapered at each end and grooved longitudinally at one side as indicated at 67 in Figs. 4 and 6. The auxiliary frame 35 has a linear projection 68 thereon that extends into the groove 67 in the core 36. The screws 69 extend through the auxiliary frame 35 and through the linear projection 68 and into the magnetic core 36 for supporting the core in a position enabling the winding 66 to shift angularly therearound. The core 36 is mounted in spaced relation to the magnetic poles 70 and 71 with respect to which the winding 66 moves.

I have found the construction of my invention highly practical in manufacture and use and while I have described my invention in certain of its preferred embodiments, I realize that modifications may be made, and I desire that it be understood that no limitations shown in my invention are intended other than may be embodied by the scope of the appended claims.

What I claim as new and desire to secure by Letters Patent of the United States is as follows:

1. An adjustable indicator setting mechanism comprising a casing having a side wall extending in a plane normal to the front of the casing, a flat recess in said side wall extending from the front edge of said side wall and terminating in a socket-like recess in a substantially central position in said side wall, an adjustable lever having a circular disc on one end thereof seated in the said socket-like recess and angularly adjustable therein, said lever operating within the limits of the thickness dimension of said flat recess and projecting beyond the front edge of said side wall and controllable from the front of said casing, means journaled in the socket-like recess in said casing and connected with said disc, means extending interiorly of said casing from said last mentioned means and angularly adjustable in proportion to the adjustment of said lever, a meter shaft journaled with respect to said casing, an indicator carried by said meter shaft and operative over a scale, torsional tension means for said shaft, and means interconnecting said first mentioned means and said torsional tension means for correcting the position of said indicator with respect to said scale.

2. An adjustable indicator setting mechanism as set forth in claim 1 in which said flat recess is substantially V-shaped and is tapered from the front edge of said casing to said socket-like recess where said socket-like recess is located at the apex of said substantially V-shaped recess, and wherein said lever is adjustable in a plane substantially parallel with the plane of the side wall of said casing.

3. An adjustable indicator setting mechanism as set forth in claim 1 in which the means journaled in said socket-like recess and connected with said disc is a flat circular disc keyed to the circular disc on the end of said lever and wherein the means interconnecting said torsional tension means, and the means extending interiorly of said casing consists of a pin carried by said flat circular disc and connected to said torsional tension means.

4. An adjustable indicator setting mechanism as set forth in claim 1 in which the means journaled in said socket-like recess and connected with said disc is a flat circular disc keyed to the circular disc on the end of said lever and wherein the means interconnecting said torsional tension means and the means extending interiorly of said casing consists of a pin carried by said flat circular disc, and a radially disposed fork associated with said meter shaft, said pin extending into said fork and being slidable therein as said flat circular disc is angularly adjusted, and a connection from said fork to said torsional tension means.

5. An adjustable indicator setting mechanism as set forth in claim 1 in which the means journaled in said socket-like recess and connected with said disc is a flat circular disc keyed to the circular disc on the end of said lever and wherein the means interconnecting said torsional tension means and the means extending interiorly of said casing consists of a pin carried by said flat circular disc, and a radially extending flat strip associated with said meter shaft, said flat strip having an outstruck lug therein projecting toward said torsional tension means and connected therewith on its extremity and a bifurcation on the end of said strip slidably engaging said pin whereby movement of said pin revolves said strip and adjusts the tension on said torsional tension means for correspondingly controlling the position of said indicator relative to said scale.

6. An adjustable indicator setting mechanism as set forth in claim 1, which includes a front cover for said casing enclosing said scale and indicator and wherein said front cover is recessed on the side wall thereof with the edges thereof aligned with the recess on the side of said casing for permitting the free movement of said lever in a plane substantially parallel with the side wall of said casing.

7. An adjustable indicator setting mechanism as set forth in claim 1, which includes a front cover for said casing enclosing said scale and indicator and wherein said front cover is provided with a tapered recess in the side wall thereof and wherein the recess in the side wall of said casing is substantially V-shaped and extends from said socket-like recess as an apex whereby said lever may be swung in a plane substantially parallel with the plane of the side wall of said casing between limits defined by said substantially V-shaped recess in the side wall of said casing and by abutment with the sides of the tapered recess in the side wall of said front cover.

8. An adjustable indicator setting mechanism as set forth in claim 1 in which said torsional tension means for said shaft consists of a spiral spring disposed in a plane substantially parallel with the plane of operation of said flat lever, said spring being connected at one end with said shaft and being connected at the other end with said means journaled in the socket-like recess in said casing.

9. An adjustable indicator setting mechanism as set forth in claim 1 in which said torsional tension means for said shaft consists of a pair of spiral springs disposed in planes substantially parallel with the plane of said flat lever and arranged adjacent opposite ends of said shaft, said springs being connected at their inner ends with said shaft and wherein the outer end of one of said springs is connected with a position fixed with respect to said casing, and wherein the outer end of the other of said springs is connected with the means journaled in the socket-like recess in said casing.

10. An adjustable indicator setting mechanism as set forth in claim 1 in which said torsional tension means for said shaft consists of a pair of spiral springs disposed in planes substantially parallel with the plane of said flat lever and arranged adjacent opposite ends of said shaft, one of said springs being wound clockwise and the other of said springs being wound counter-clockwise, the inner ends of said springs being connected with said shaft and the outer end of one of the springs being connected to a position fixed with respect to said casing and the outer end of the other of said springs being connected with the means journaled in the socket-like recess in said casing.

11. A meter housing comprising a substantially polygonal case of insulation material closed on the rear and ends thereof and open at the front, mounting lugs connected with the ends of said case and extending normal to the planes thereof, said case having one side wall formed from insulation material with the opposite side open, a magnetic shield plate closing the open side of said case and a separate magnetic shield plate attachable over the first mentioned side wall of said case, a meter mechanism housed within said case and including a movable indicator movable across the front of the case, a detachable front cover of transparent material engageable within the ends of said case and extending across the front thereof, a calibrated scale mounted between said front cover and the ends of said case, in a position adjacent said movable indicator, and illumination means mounted in the ends of said case offset behind said mounting lugs and adjacent opposite ends of said scale for uniformly illuminating said scale through said front cover.

12. A meter housing as set forth in claim 11 in which said separate magnetic shield plate and one side of the front cover adjacent thereto is recessed, and wherein an adjustable lever is pivotally mounted in the side wall of said case adjacent said separate magnetic shield plate and is adjustable within the recess in said separate magnetic shield plate, and within the side of said front cover in a plane substantially parallel with the plane of the side wall of said case, and means interconnecting said lever and said movable indicator for adjusting the position of said indicator with respect to said calibrated scale.

13. A meter housing as set forth in claim 11 in which another magnetic shield plate is mounted interiorly within each end of said case adjacent opposite sides of said meter mechanism supplementing said aforementioned magnetic shifted plates.

14. An adjustable indicator setting mechanism as set forth in claim 1 in which the means journaled in the socket-like recess in said casing and connected with said disc includes an interiorly arranged arcuate shaped cut-out portion complementary to the peripheral curvature of said disc and wherein the means interconnecting the first mentioned means and said torsional tension means is angularly movable in a plane extending into the arcuate shaped cutout portion of said means journaled in said socket-like recess.

15. An adjustable indicator setting mechanism as set forth in claim 1 in which the means journaled in the socket-like recess in said casing and connected with said disc is a cylindrical member having a relatively shallow longitudinal axis having an interiorly arranged arcuate shaped cutout portion complementary to the peripheral curvature of said disc, a pin extending normal to the plane of the end of said cylindrical member, and located centrally of said cutout portion and wherein the means interconnecting the first mentioned means and said torsional tension means consists of a flat member extending radially with respect to said shaft and with the end thereof projecting into a position within said cutout portion, said flat member being bifurcated on said last mentioned end with the bifurcation embracing opposite sides of said pin, said flat member being connected with said torsional tension means in a position intermediate said shaft and the bifurcation therein whereby angular movement of said lever revolves said means journaled in said socket-like recess for displacing said pin and moving the bifurcated end of said flat member within the arcuate shaped cutout portion of said disc for correspondingly varying the tension on said torsional tension means.

References Cited in the file of this patent

UNITED STATES PATENTS

| | | |
|---|---|---|
| 529,435 | Weston | Nov. 20, 1894 |
| 1,227,468 | MacGahan | May 22, 1917 |
| 2,464,190 | Wen | Mar. 8, 1949 |
| 2,560,879 | Lamb | July 17, 1951 |
| 2,576,583 | Emery | Nov. 27, 1951 |
| 2,596,297 | Shotter | May 13, 1952 |
| 2,619,933 | Gordon | Dec. 2, 1952 |
| 2,626,296 | Side | Jan. 20, 1953 |

FOREIGN PATENTS

| | | |
|---|---|---|
| 9,351 | Great Britain | Apr. 20, 1906 |